(12) United States Patent
Chen et al.

(10) Patent No.: US 7,889,487 B2
(45) Date of Patent: Feb. 15, 2011

(54) PORTABLE COMPUTER AND HINGE MECHANISM THEREOF

(75) Inventors: Ming-Feng Chen, Taipei (TW); Chien-Chung Chien, Taipei (TW); Ming-Hui Chen, Taipei (TW); Shu-Hua Yeh, Taipei (TW); Chien-Heng Kuo, Taipei (TW); Yen-Chang Lai, Taipei (TW)

(73) Assignee: Inventec Corporation (TW)

( * ) Notice: Subject to any disclaimer, the term of this patent is extended or adjusted under 35 U.S.C. 154(b) by 68 days.

(21) Appl. No.: 12/480,462

(22) Filed: Jun. 8, 2009

(65) Prior Publication Data

US 2010/0134970 A1    Jun. 3, 2010

(30) Foreign Application Priority Data

Nov. 28, 2008    (CN) .................. 2008 1 0182061

(51) Int. Cl.
*G06F 1/16*    (2006.01)
(52) U.S. Cl. .................. 361/679.27; 710/313; 16/374; 345/173; 455/550.1
(58) Field of Classification Search .................. 710/300, 710/301, 303, 313, 316, 64, 72; 16/274, 16/351, 362, 374, 340, 342, 337; 345/659, 345/519, 89, 104, 536, 418, 520, 156, 173; 340/870.02, 293; 455/405, 90.5, 575.3, 550.1, 455/575.1, 571; 380/30, 239; 365/185.17, 365/189.05; 463/46, 31; 361/679.27, 679.01, 361/679.05, 679.02, 679.29, 679.26, 679.22, 361/679.31
See application file for complete search history.

(56) References Cited

U.S. PATENT DOCUMENTS

| | | | |
|---|---|---|---|
| 2004/0165342 A1* | 8/2004 | Chang | 361/681 |
| 2007/0155512 A1* | 7/2007 | Wells et al. | 463/46 |
| 2010/0134969 A1* | 6/2010 | Chen et al. | 361/679.27 |

* cited by examiner

*Primary Examiner*—Hung V Duong
(74) *Attorney, Agent, or Firm*—Lowe Hauptman Ham & Berner, LLP

(57) ABSTRACT

A portable computer and a hinge mechanism thereof are provided. The portable computer includes a display screen, a host and a hinge mechanism. The hinge mechanism is connected with the display screen and the host. The hinge mechanism is used for rotating the display screen around the host. The hinge mechanism includes a bottom board, a pivot, a network connecter and a slanting board. The pivot is disposed on the bottom board, wherein one end of the pivot is connected with the host and the other end of the pivot is connected with the display screen. The network connecter is disposed on the bottom board. The slanting board is disposed on the bottom board and slants to the pivot. The slanting board has an opening which exposes the network connecter.

10 Claims, 2 Drawing Sheets

PORTABLE COMPUTER AND HINGE MECHANISM THEREOF

This application claims the benefit of People's Republic of China application Serial No. 200810182061.9, filed Nov. 28, 2008, the subject matter of which is incorporated herein by reference.

BACKGROUND OF THE INVENTION

1. Field of the Invention

The invention relates in general to a portable computer and a hinge mechanism thereof, and more particularly to a portable computer whose display screen rotates around host and a hinge mechanism thereof.

2. Description of the Related Art

With the features of lightweight, slimness and compactness, portable computer has gradually replaced desk-top computer and become the mainstream product in the computer market.

A portable computer includes a display screen, a host and a hinge mechanism. The hinge mechanism is disposed between the display screen and the host for rotating the display screen around the host. The design of the hinge mechanism affects the appearance of the display screen and the host as well as the disposition of other elements. Thus, the design of a suitable hinge mechanism has always been an important issue in the research and development of the portable computer.

SUMMARY OF THE INVENTION

The invention is directed to a portable computer and a hinge mechanism thereof. The structural design of the hinge mechanism enables other elements to achieve an appropriate design of disposition.

According to a first aspect of the present invention, a portable computer is provided. The portable computer includes a display screen, a host and a hinge mechanism. The hinge mechanism is connected with the display screen and the host. The hinge mechanism is used for rotating the display screen around the host. The hinge mechanism includes a bottom board, a pivot, a network connecter and a slanting board. The pivot is disposed on the bottom board, wherein one end of the pivot is connected with the host and the other end of the pivot is connected with the display screen. The network connecter is disposed on the bottom board. The slanting board is disposed on the bottom board and slants to the pivot. The slanting board has an opening which exposes the network connecter.

According to a second aspect of the present invention, a hinge mechanism is provided. The hinge mechanism is connected with a display screen and a host of a portable computer. The hinge mechanism is used for rotating the display screen around the host. The hinge mechanism includes a bottom board, a pivot, a network connecter and a slanting board. The pivot is disposed on the bottom board, wherein one end of the pivot is connected with the host, and the other end of the pivot is connected with the display screen. The network connecter is disposed on the bottom board. The slanting board is disposed on the bottom board and slants to the pivot. The slanting board has an opening which exposes the network connecter.

The invention will become apparent from the following detailed description of the preferred but non-limiting embodiments. The following description is made with reference to the accompanying drawings.

DETAILED DESCRIPTION OF THE INVENTION

Preferred embodiments are disclosed below for elaborating the invention. However, the following embodiments are for the purpose of elaboration only, not for limiting the scope of protection of the invention. Besides, secondary elements are omitted in the following embodiments to highlight the technical features of the invention.

Figure 1:
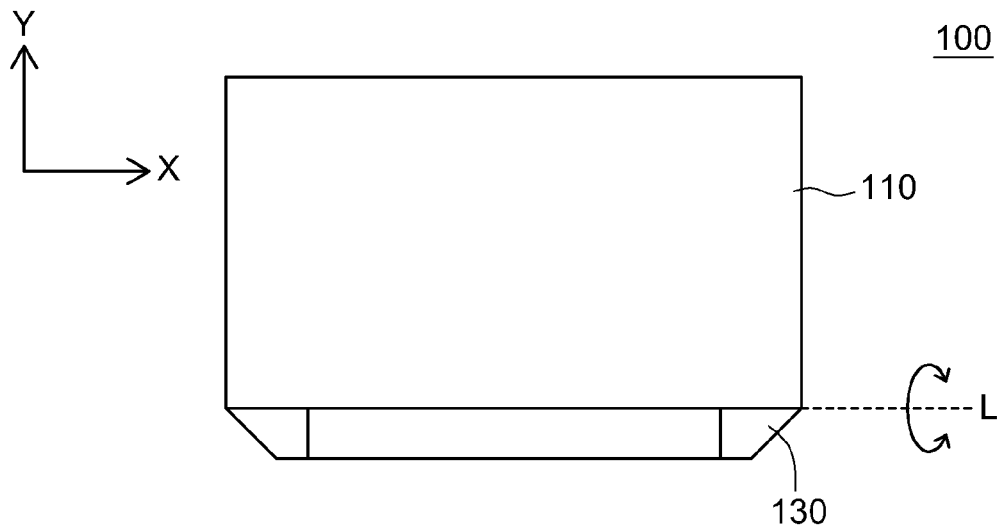
FIG. 1 shows a portable computer according to a preferred embodiment of the invention.

Referring to FIG. 1, a portable computer 100 according to a preferred embodiment of the invention is shown. The portable computer 100 includes a display screen 110, a host and a hinge mechanism 130 (the host is covered by the display screen 110 and is thus not illustrated in FIG. 1). As indicated in FIG. 1, the hinge mechanism 130 is a trapezoid structure. The hinge mechanism 130 is connected with the display screen 110 and the host. The hinge mechanism 130 is used for rotating the display screen 110 with respect to the host around the axial line L.

Figure 2:
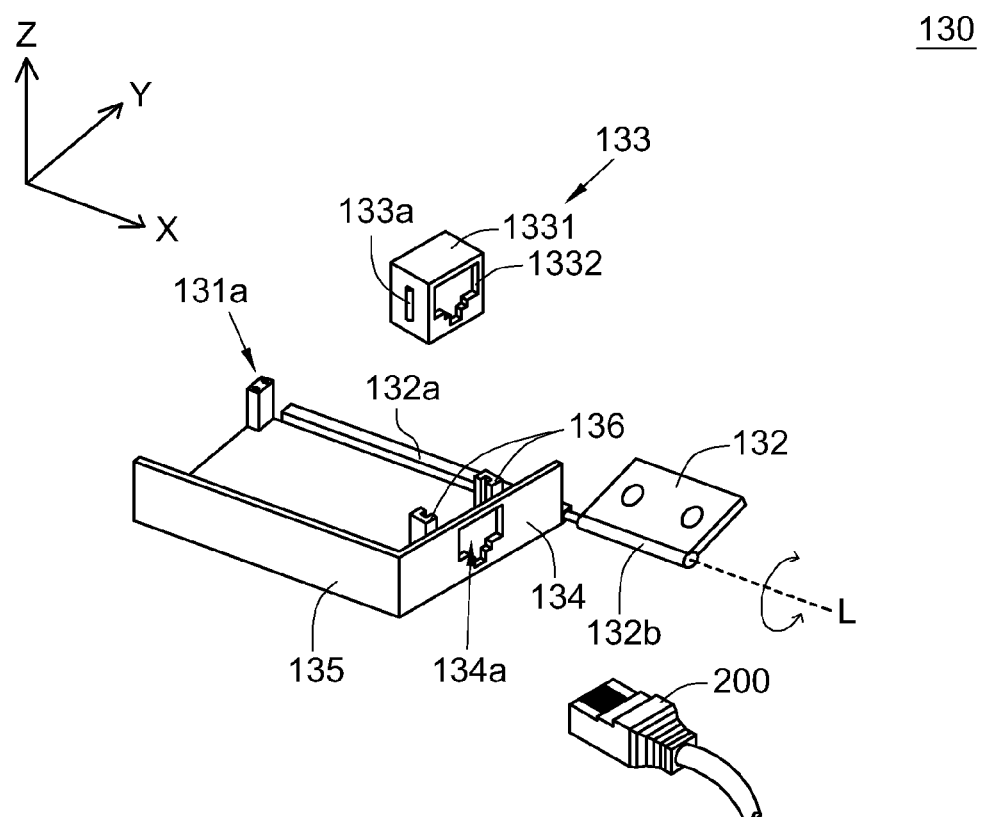
FIG. 2 shows a 3-D diagram of a hinge mechanism.
Figure 3:
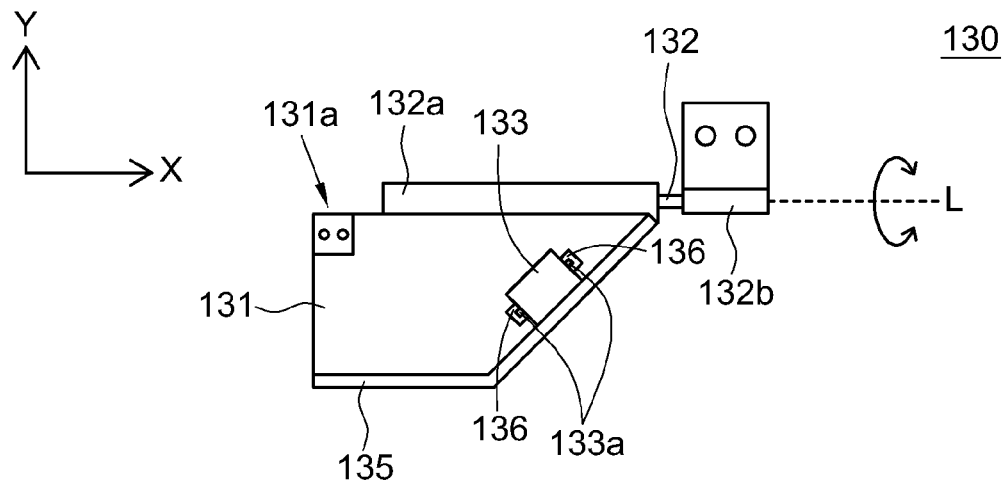
FIG. 3 shows a top view of a hinge mechanism.

Referring to FIGS. 2~3. FIG. 2 shows a 3-D diagram of a hinge mechanism 130. FIG. 3 shows a top view of a hinge mechanism 130. As indicated in FIG. 2, the hinge mechanism 130 includes a bottom board 131, a pivot 132, a network connecter 133, a slanting board 134, a parallel side board 135 and a sliding-rail structure 136. The pivot 132 is disposed on the bottom board 131. The first end 132a of the pivot 132 is connected with the host, and the second end 132b of the pivot 132 is connected with the display screen 110. The first end 132a of the pivot 132 is fixed on the bottom board 131. The bottom board 131 has a locking hole 131a used for locking the host and the bottom board 131. The second end 132b of the pivot 132 is locked on the display screen 110.

When the first end 132a of the pivot 132 rotates around the second end 132b, the host and the bottom board 131 will be linked with the first end 132a, and the display screen 110 will be linked with the second end 132b of the pivot 132. Thus, the display screen 110 can be rotated around the host.

A parallel side board 135 is disposed on the bottom board 131 and substantially parallel to the pivot 132. A slanting board 134 is disposed on the bottom board 131 and slants to the pivot 132 and is further connected with the pivot 132 and the parallel side board 135. In the present embodiment of the invention, the contained angle between the slanting board 134 and the pivot 132 substantially is 45 degrees. Therefore, the parallel side board 135, the slanting board 134 and the pivot 132 substantially form a trapezoid structure. In the present embodiment of the invention, the parallel side board 135 and the bottom board 131 are integrally formed in one piece, but the slanting board 134 and the bottom board 131 are two separate structures.

Besides, two sliding-rail structures 136 are erected on the bottom board 131 for disposing the network connecter 133. The operator slides two protrusions 133a of the network connecter 133 to the sliding-rail structures 136 in a perpendicular manner, so that the network connecter 133 is firmly disposed on the bottom board 131. (only one protrusion 133a can be seen in FIG. 2 due to the restriction of view angle)

The two sliding-rail structures 136 do not have to be opposite to each other. For example, one sliding-rail structure 136 is closer to the slanting board 134, and the other sliding-rail structure 136 is farther from the slanting board 134. It is ascertained that the network connecter 133 can correctly slide into the sliding-rail structures 136 as long as the two protrusions 133a of the network connecter 133 correspond to the two sliding-rail structures 136.

Next, the slanting board 134 is mounted on the bottom board 131. Meanwhile, the opening 134a of the slanting board 134 (illustrated in FIG. 2) exactly exposes the network connecter 133, so that the user can insert the network cable joint 200 from the external of the hinge mechanism 130.

The network connecter 133 includes a main body 1331 and an extension portion 1332. The main body 1331 and the extension portion 1332 are formed from two different materials having different colors by way of injection. After the network connecter 133 is disposed on the bottom board 131 and the slanting board 134 is disposed on the bottom board 131, the extension portion 1332 will be projected from the slanting board 134.

Besides, the electrical contact of the network connecter 133 is not directly soldered on circuit board but is soldered at one end of a wire instead. The other end of the wire is soldered on the circuit board. Therefore, the design of the hinge mechanism 130 is not restricted by the disposition of the circuit board.

Figure 4:
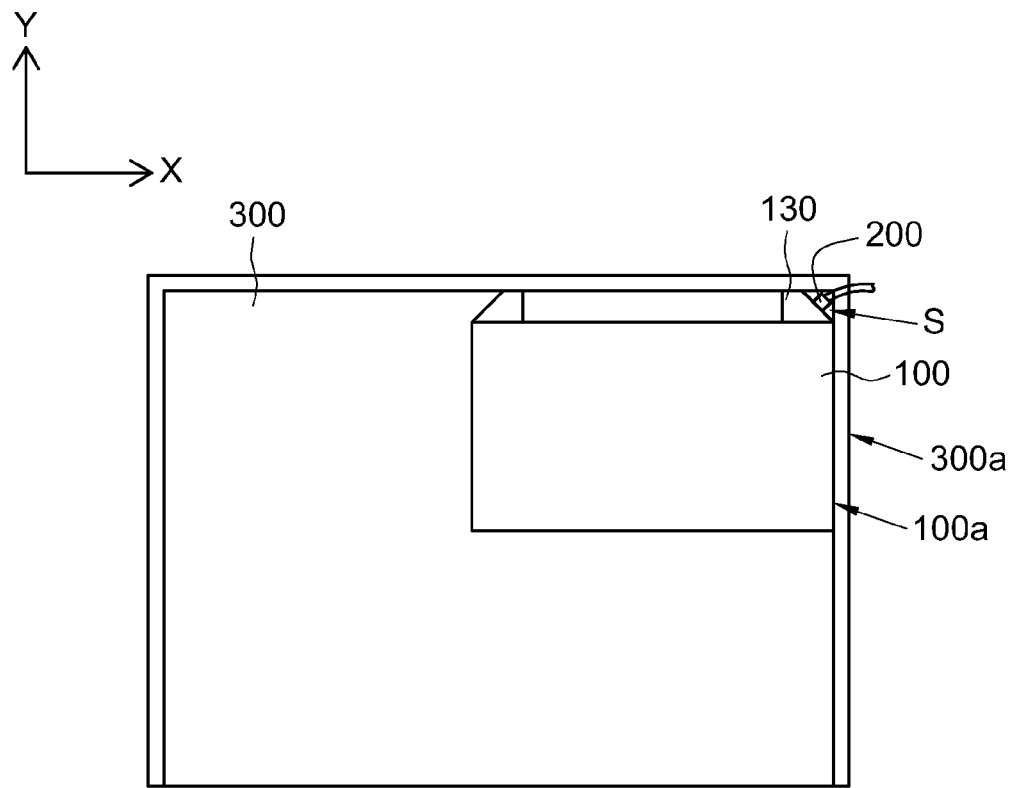
FIG. 4 shows a portable computer, a desk-top and a network cable joint.

Referring to FIG. 4, a portable computer 100, a desk-top 300 and a network cable joint 200 are shown. As the slanting board 134 tilts 45 degrees with respect to the pivot 132 (illustrated in FIG. 2), a space S is formed at the corner between the slanting board 134 and the desk-top 300 when the portable computer 100 is placed on rectangular desk-top 300. The space S exactly disposes the network cable joint 200, so the user can push a lateral side 100a of the portable computer 100 to a lateral side 300a of the rectangular desk-top 300. Therefore, the utilization rate of the space is maximized.

The portable computer and the hinge mechanism thereof disclosed in the above embodiments of the invention have many advantages exemplified below.

1. When the first end of the pivot rotates with respect to the second end, the host and the bottom board will be linked with the first end, and the display screen will be linked with the second end the pivot. Thus, the display screen can rotate around the host.

2. The sliding-rail structures are erected on the bottom board for disposing the network connecter. During the assembly process, the operator slides two protrusions of the network connecter into sliding-rail structures in a perpendicular manner so that the network connecter is firmly disposed on the bottom board.

3. The main body and the extension portion of the network connecter are formed from two different materials having different colors by way of injection. Thus, there is no need to assemble the main body and the extension portion, hence reducing the labor and material cost for assembling the main body and the extension portion.

4. The electrical contact of the network connecter is not directly soldered on circuit board but is soldered at one end of a wire instead. The other end of the wire is soldered on the circuit board, so the design of the hinge mechanism is not restricted by the disposition of the circuit board.

5. As the slanting board tilts 45 degrees with respect to the pivot, a space is formed at the corner between the slanting board and the desk-top when the portable computer is placed on rectangular desk-top. The space exactly disposes the network cable joint, so that the user can push a lateral side of the portable computer to a lateral side of the rectangular desk-top. Therefore, utilization rate of the space is maximized.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, comprising:
   a display screen;
   a host; and
   a hinge mechanism connected with the display screen and the host, wherein the hinge mechanism is for rotating the display screen around the host, and the hinge mechanism comprises:
      a bottom board;
      a pivot disposed on the bottom board, wherein the one end of the pivot is connected with the host, and the other end of the pivot is connected with the display screen;
      a network connecter disposed on the bottom board; and
      a slanting board disposed on the bottom board, wherein the slanting board slants to the pivot and has an opening, which exposes the network connecter.

2. The portable computer according to claim 1, wherein the hinge mechanism further comprises:
   a parallel side board disposed on the bottom board and substantially parallel to the pivot.

3. The portable computer according to claim 1, wherein the hinge mechanism further comprises:
   two sliding-rail structures disposed on the bottom board for disposing the network connecter.

4. The portable computer according to claim 3, wherein the sliding-rail structures are erected on the bottom board.

5. The portable computer according to claim 1, wherein the contained angle between the slanting board and the pivot is substantially 45 degrees.

6. The portable computer according to claim 1, wherein one end of the pivot is fixed on the bottom board, which has a locking hole for locking the host and the bottom board.

7. A hinge mechanism connected with a display screen and a host of a portable computer, wherein the hinge mechanism is for rotating the display screen around the host, and the hinge mechanism comprises:
   a bottom board;
   a pivot disposed on the bottom board, wherein the one end of the pivot is connected with the host, and the other end of the pivot is connected with the display screen;
   a network connecter disposed on the bottom board; and
   a slanting board disposed on the bottom board, wherein the slanting board slants to the pivot and has an opening, which exposes the network connecter.

8. The hinge mechanism according to claim 7, further comprising:
   a parallel side board disposed on the bottom board and substantially parallel to the pivot.

9. The hinge mechanism according to claim 7, further comprising:
   two sliding-rail structures disposed on the bottom board for disposing the network connecter.

10. The hinge mechanism according to claim 7, wherein one end of the pivot is fixed on the bottom board, which has a locking hole for locking the host and the bottom board.

* * * * *